United States Patent
Jacobson et al.

[11] Patent Number: 6,130,773
[45] Date of Patent: *Oct. 10, 2000

[54] NONEMISSIVE DISPLAYS AND PIEZOELECTRIC POWER SUPPLIES THEREFOR

[75] Inventors: Joseph M. Jacobson; Barrett Comiskey, both of Cambridge, Mass.

[73] Assignee: Massachusetts Institute of Technology, Cambridge, Mass.

[ * ] Notice: This patent is subject to a terminal disclaimer.

[21] Appl. No.: 09/189,254

[22] Filed: Nov. 10, 1998

Related U.S. Application Data

[63] Continuation of application No. 08/738,260, Oct. 25, 1996, Pat. No. 5,930,026.

[51] Int. Cl.⁷ .............................. G02B 26/00; G09G 3/34; G09F 1/00
[52] U.S. Cl. ...................... 359/296; 345/107; 40/124.02; 40/124.09
[58] Field of Search ........................... 359/296; 345/107; 40/124.01, 124.02, 124.09, 124.11, 124.12; 36/136, 137

[56] References Cited

U.S. PATENT DOCUMENTS

| | | |
|---|---|---|
| 2,800,457 | 7/1957 | Green et al. . |
| 3,036,388 | 5/1962 | Tate ............................................. 35/66 |
| 3,406,363 | 10/1968 | Tate ......................................... 335/302 |
| 3,460,248 | 8/1969 | Tate ......................................... 29/607 |
| 3,585,381 | 6/1971 | Hedson et al. . |
| 3,668,106 | 6/1972 | Ota . |
| 4,001,140 | 1/1977 | Foris et al. . |
| 4,088,395 | 5/1978 | Giglia ...................................... 350/357 |
| 4,093,534 | 6/1978 | Carter et al. . |
| 4,126,854 | 11/1978 | Sheridon ................................. 340/373 |

(List continued on next page.)

FOREIGN PATENT DOCUMENTS

| | | |
|---|---|---|
| 0 186 710 A1 | 7/1986 | European Pat. Off. . |
| 0 268877 A2 | 6/1988 | European Pat. Off. . |
| 0 281 204 A2 | 9/1988 | European Pat. Off. . |
| 0 443 571 A2 | 8/1991 | European Pat. Off. . |
| 0 540 281 A2 | 5/1993 | European Pat. Off. . |
| 0 622 721 A1 | 11/1994 | European Pat. Off. . |

(List continued on next page.)

OTHER PUBLICATIONS

J. Sankus "Electrophoretic Display Cell," *Xerox Disclosure Journal*, Abstract, vol. 4, No. 3, May/Jun. 1979.

Nuno A. Vaz et al., "Dual frequency addressing of polymer–dispensed liquid–crystal films," *Journal of Applied Physics*, vol. 65, No. 12, Jun., 1989, pp. 5043–5049.

Lawerence L. Lee, "Fabrication of Magnetic Particles Display," *Proceedings of the S.I.D.*, vol. 18, Nos. 3&4, 1977, pp. 283–288.

N.K. Sheridon et al., "Gyricon—A Twisting Ball Display," *Proceedings of the S.I.D.*, vol. 18, Nos. 3&4, 1977, pp. 289–293.

(List continued on next page.)

*Primary Examiner*—Georgia Epps
*Assistant Examiner*—Evelyn A. Lester
*Attorney, Agent, or Firm*—Cesari and McKenna, LLP

[57] ABSTRACT

An electrophoretic display has a substantially two-dimensional arrangement of microcapsules each having therein an electrophoretic composition of a dielectric fluid and a suspension of particles that visually contrast with the dielectric liquid and also exhibit surface charges; a pair of electrodes, at least one of which is visually transparent, disposed on and covering opposite sides of the microcapsule arrangement; and a power source for creating a potential difference between the two electrodes, the potential difference causing the particles to migrate toward one of the electrodes. The display may be powered by one or more piezoelectric elements, which are also suitable for powering other types of nonemissive displays.

3 Claims, 5 Drawing Sheets

U.S. PATENT DOCUMENTS

| | | |
|---|---|---|
| 4,143,103 | 3/1979 | Sheridon ..................................... 264/4 |
| 4,185,621 | 1/1980 | Morrow ................................. 128/672 |
| 4,231,641 | 11/1980 | Randin .................................. 350/357 |
| 4,261,653 | 4/1981 | Goodrich .............................. 350/362 |
| 4,273,672 | 6/1981 | Vassiliades . |
| 4,298,448 | 11/1981 | Muller et al. . |
| 4,305,807 | 12/1981 | Somlyody . |
| 4,368,952 | 1/1983 | Murata et al. ......................... 350/362 |
| 4,418,346 | 11/1983 | Batchelder ............................. 340/787 |
| 4,419,383 | 12/1983 | Lee .......................................... 427/47 |
| 4,430,648 | 2/1984 | Togashi et al. ........................ 340/718 |
| 4,438,160 | 3/1984 | Ishikawa et al. ...................... 427/214 |
| 4,643,528 | 2/1987 | Bell, Jr. ................................... 350/334 |
| 4,748,366 | 5/1988 | Taylor ..................................... 310/328 |
| 4,919,521 | 4/1990 | Tada et al. ............................. 350/362 |
| 4,931,019 | 6/1990 | Park ........................................ 434/409 |
| 4,947,219 | 8/1990 | Boehm ..................................... 357/20 |
| 5,057,363 | 10/1991 | Nakanishi ........................... 428/321.5 |
| 5,066,559 | 11/1991 | Elmasry et al. . |
| 5,082,351 | 1/1992 | Fergason . |
| 5,105,185 | 4/1992 | Nakanowatari et al. .............. 340/784 |
| 5,270,843 | 12/1993 | Wang ....................................... 359/52 |
| 5,380,362 | 1/1995 | Schubert . |
| 5,389,945 | 2/1995 | Sheridon .................................. 345/85 |
| 5,398,131 | 3/1995 | Hall et al. .............................. 359/465 |
| 5,484,522 | 1/1996 | Entrekin . |
| 5,508,068 | 4/1996 | Nakano ..................................... 428/1 |
| 5,508,720 | 4/1996 | DiSanto et al. ........................ 345/169 |
| 5,565,885 | 10/1996 | Tamanoi ................................. 345/100 |
| 5,604,027 | 2/1997 | Sheridon ................................ 428/323 |

FOREIGN PATENT DOCUMENTS

| | | |
|---|---|---|
| 0721 176 | 7/1996 | European Pat. Off. . |
| 62-058222 | 3/1987 | Japan . |
| 62-231930 | 10/1987 | Japan . |
| 64-86116 | 3/1989 | Japan . |
| 01177517 | 7/1989 | Japan . |
| 6089081 | 3/1994 | Japan . |
| 1 314 906 | 4/1973 | United Kingdom . |
| PCT/US96/13469 | 8/1996 | WIPO . |

OTHER PUBLICATIONS

M. Saitoh et al., "A Newly Development Electrical Twisting Ball Display," *Proceedings of the S.I.D.*, vol. 23, No. 4, 1982, pp. 249–253.

N. Engashira et al., "A Solid Electrochromic Cell Consisting of Lu–Diphthalocyanine and Lead Fluoride" *Proceedings of the S.I.D.*, vol. 28, No. 3, 1987, pp. 227–232.

Y.Yang et al., "A New Architecture for Polymer Transistors," *Nature*, vol. 372, Nov. 1994, pp. 344–346.

S. Jin et al., "Optically Transparent, Electrically Conductive Composite Medium," *Science*, Reports, 1992, pp. 446–448.

Martin R. Bryce, "Seeing Through Synthetic Metals," *Nature*, vol. 335, Sep. 1988, pp. 12–13.

O. Bohnke et al., "Polymer–Based Solid Electrochromic Cell for Matrix–Addressable Display Devices, " *J. Electrochem. Soc.*, vol. 138, No. 12, Dec. 1991, pp. 3612–3617.

Hiroshi Hosaka et al., "Electromagnetic Microrelays: Concepts and Fundamental Characteristics," *Sensors and Actuators A*, No. 40, 1994, pp. 41–47.

Clarisse, C., et al., "Field–Effect Transistor with Diphthalocyanine Thin Film," Electronics Letters, 24(11):674–675 (May 1988).

NONEMISSIVE DISPLAYS AND PIEZOELECTRIC POWER SUPPLIES THEREFOR

RELATED APPLICATION

This is a continuation of U.S. Ser. No. 08/738,260, filed on Oct. 25, 1996, now U.S. Pat. No. 5,930,026.

FIELD OF THE INVENTION

The present invention relates to electronic display elements, and more particularly to nonemissive displays.

BACKGROUND OF THE INVENTION

Nonemissive displays convey information using contrast differences, which are achieved by varying the reflectance of different frequencies of light; they are thus distinct from traditional emissive displays, which stimulate the eye by emitting light. One type of nonemissive display is an electrophoretic display, which utilizes the phenomenon of electrophoresis to achieve contrast. Electrophoresis refers to movement of charged particles in an applied electric field. When electrophoresis occurs in a liquid, the particles move with a velocity determined primarily by the viscous drag experienced by the particles, their charge, the dielectric properties of the liquid, and the magnitude of the applied field.

An electrophoretic display utilizes charged particles of one color suspended in a dielectric liquid medium of a different color (that is, light reflected by the particles) is absorbed by the liquid. The suspension is housed in a cell located between (or partly defined by) a pair of oppositely disposed electrodes, one of which is transparent. When the electrodes are operated to apply a DC or pulsed field across the medium, the particles migrate toward the electrode of opposite sign. The result is a visually observable color change. In particular, when a sufficient number of the particles reach the transparent electrode, their color dominates the display; if the particles are drawn to the other electrode, however, they are obscured by the color of the liquid medium, which dominates instead.

Ideally, the particles maintain a strong uniform charge throughout the lifetime of the device and move as rapidly as possible under the influence of a relatively small electric field. The switching time of suspended particles located between two electrodes is given by $$t = \frac{6\pi d^2 \eta}{V \varepsilon \zeta}$$

where d is the spacing between electrodes, $\eta$ is the viscosity of the liquid medium, $\varepsilon$ is its dielectric constant, V is the potential difference between the electrodes, and $\zeta$ is the zeta potential of the particles. The quantity t represents the time required for the population of particles to migrate from one of the electrodes to the other. Thus, the system is usually selected to minimize t. For example, the spacing between electrodes is as small as is necessary to ensure that the particles are completely obscured following migration away from the transparent electrode.

Useful electrophoretic displays are bistable: their state persists even after the activating electric field is removed. This is generally achieved via residual charge on the electrodes and van der Waals interactions between the particles and the walls of the electrophoretic cell. Unfortunately, the stability of current electrophoretic displays is limited.

Although flocculation or settling of particles can be avoided by matching the density of the particles with that of the liquid medium, long-term particle agglomeration remains a problem. That is, cohesive forces among particles may eventually overcome dispersive forces, degrading the appearance and function of the display. For example, particle agglomerations respond less efficiently to an applied field (increasing switching time) and are also more vulnerable to the action of gravity (limiting usefulness in arbitrary orientations); thus, if the display is oriented vertically, gravity can overcome adhesion to the cell wall and cause agglomerations to settle.

DESCRIPTION OF THE INVENTION

Brief Summary of the Invention

In accordance with the invention, the foregoing limitations are overcome by microencapsulating individual elements of an electrophoretic display. This approach eliminates the effects of agglomeration on a scale larger than the size of the capsule, which preferably is sufficiently small to be individually unnoticeable. Thus, the capsules function in a manner similar to pixels (although typically they are not individually addressable); even if agglomeration occurs, its effect is confined to a very small area. Furthermore, by setting an upper limit to the possible size of an agglomeration—that is, by preventing accumulations larger than the particle content of a capsule—the bulk effects of diminished field responsiveness and vulnerability to gravity are likewise limited.

Although, again, individual capsules within a display element are typically not individually addressed, the approach of the invention lends itself to production of relatively small multiple-capsule elements that can themselves be individually addressable components of a larger array. For example, the elements can each present a circular profile and be arrayed as a matrix, functioning as pixels in an alphanumeric display.

Accordingly, in a first aspect, the invention comprises an electrophoretic display having a substantially two-dimensional arrangement of microscopic containers ("microcapsules"), each microcapsule having therein an electrophoretic composition of a dielectric fluid and a suspension of particles that visually contrast with the dielectric liquid and also exhibit surface charges; a pair of electrodes, at least one of which is visually transparent, disposed on and covering opposite sides of the microcapsule arrangement; and means for creating a potential difference between the two electrodes, the potential difference causing the particles to migrate toward one of the electrodes. The microcapsule arrangement can be flat or curved; as used herein, the term "two-dimensional" refers to arrangements that may be fully planar, distorted or curved, and does not exclude some three-dimensional thickness. The arrangement can involve packing the microcapsules against one another in an array (generally one microcapsule thick), dispersing the microcapsules in a transparent matrix, or forming cavities or voids within such a matrix that themselves constitute the microcapsules.

In a second aspect, the invention provides novel means of electrically powering nonemissive displays using one or more piezoelectric elements (such as a sheet of polyvinylidene fluoride). Generally, the invention in this aspect may comprise a pair of oppositely disposed electrodes and, located therebetween, at least one display element, the display element being visually responsive to a potential difference between the electrodes; and a piezoelectric element connected to the electrodes, deformation of the piezoelectric element producing the necessary potential difference.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1A:
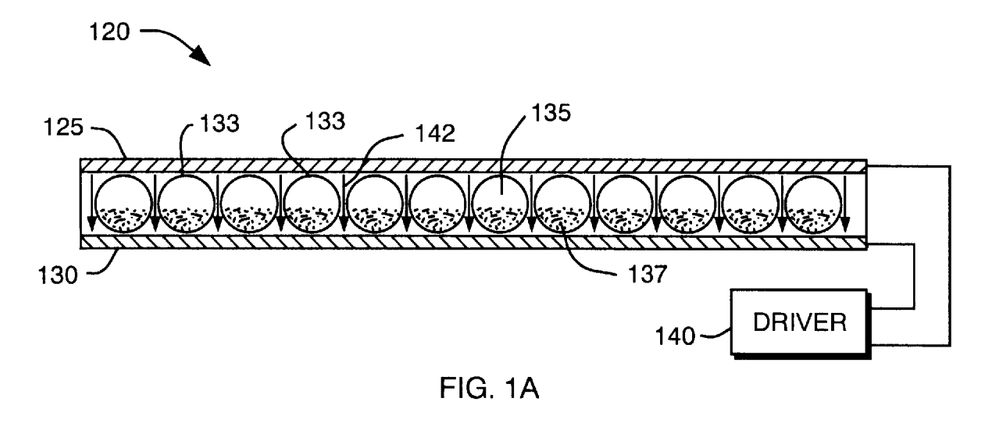
FIGS. 1A–1B are enlarged sectional views showing microencapsulated electrophoretic display arrangements in accordance with the present invention.
Figure 1B:
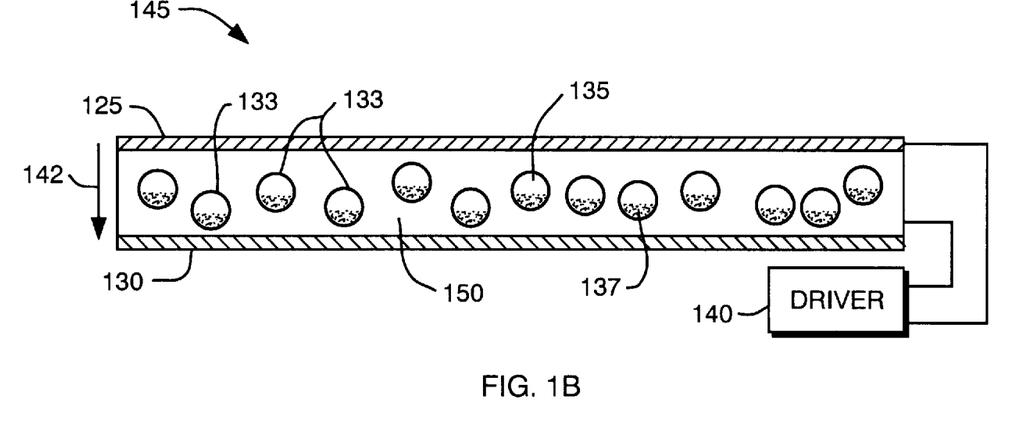

Refer first to FIGS. 1A–1B, which illustrate alternative embodiments of microencapsulated electrophoretic display arrangements in accordance with the present invention. In FIG. 1A, a display 120 includes a pair of planar electrodes 125, 130 which reside on opposite sides of a substantially planar arrangement of microscopic containers, or microcapsules, 133. At least electrode 133 is visually transparent so that a viewer may observe the color exhibited by portions of the microcapsules 133 adjacent to electrode 130. For example, electrode 130 may comprise a semiconductor such as indium tin oxide evaporated or otherwise coated in a thin layer onto glass, mylar or other transparent substrate; the details of fabrication are well known to those skilled in the art, as are possible semiconductor alternatives to indium tin oxide (see, e.g., U.S. Pat. Nos. 3,668,106 and 4,305,807, the entire disclosures of which are hereby incorporated by reference).

Within each microcapsule 133 is an electrophoretic suspension comprising a dielectric liquid 135 and a quantity of charged particles 137, the bulk liquid and the particles contrasting visually (i.e., exhibiting observably distinguishable colors or shades). A driver circuit 140 is electrically connected to electrodes 125, 130 and is capable of creating a sufficient potential difference between the electrodes to cause migration of particles 137 to one or the other electrode within an acceptable switching time.

To impart the color of particles 137 to the display 120, driver circuit 140 creates an electric field (indicated by arrows 142) whose direction is such that particles 137 are attracted to, and migrate toward, electrode 130. In the illustrated embodiment, microcapsules 133 are spherical and substantially tangent to one another; accordingly, if each microcapsule 133 contains a quantity of particles 137 sufficient to cover half the inner surface area under the influence of an electric field, attraction of particles 137 toward electrode 130 will impart the color of the particles to display 120 in a substantially uniform, uninterrupted manner.

Microcapsules 133 need not be strictly spherical, but preferably have dimensions ranging from 5 to 500 $\mu$m, and ideally from 25 to 250 $\mu$m. The walls of microcapsules 133 should exhibit a resistivity similar to that of dielectric liquid 135. It may also be useful to match the refractive index of the microcapsules 133 with that of the electrophoretic composition. Ordinarily, liquid 135 is hydrophobic, and techniques for encapsulating a hydrophobic internal phase are well characterized in the art. The process selected may impose limitations on the identity and properties of the dielectric liquid; for example, certain condensation processes may require dielectric liquids with relatively high boiling points and low vapor pressures.

In one approach, known as "coacervation," an oil/water emulsion is formed by dispersing the electrophoretic composition (i.e., the hydrophobic dielectric liquid containing a suspension of the pigment particles 137) in an aqueous environment. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457 (the entire disclosure of which is hereby incorporated by reference).

The "interfacial polymerization" approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Our preferred microencapsulation technique is "in-situ polymerization," in which the monomers that will form the microcapsule shell are present in the aqueous phase rather than within the dispersed-phase droplets. The monomers polymerize to form a polymer with higher affinity for the internal phase than for the aqueous phase, thus condensing around the droplets as a skin. In one especially useful in-situ polymerization processes, urea and formaldehyde condense in the presence of poly(acrylic acid); see U.S. Pat. No. 4,001,140. In other useful process, described in U.S. Pat. No. 4,273,672, any of a variety of cross-linking agents borne in aqueous solution is deposited around microscopic oil droplets. Such cross-linking agents include formaldehyde, glyoxal, glutaraldehyde and other formaldehyde donors, trioxane, ethanolamine, ethylenediamine, boric acid, borates such as sodium borate, or macromolecular species such as gelatin, gum tragacanth, methylcellulose and A-stage formaldehyde condensation products. The entire disclosures of the '140 and '672 patents are hereby incorporated by reference.

Other useful techniques for creating microcapsules include mechanical methods, as are well known to those skilled in the art and described, for example, in U.S. Pat. No. 3,585,381.

A wide range of dielectric liquids may be used with the present invention; the criteria involved in their choice includes viscosity, dielectric constant, acquired charge and density. Preferred liquids include darkly colored hydrophobic fluids, such as isoparaffinic petroleum solvent or trichlorotrifluoroethane, or a mixture thereof; and other halogenated hydrocarbons, since these tend to exhibit desirably high densities (to match that of the dispersed particles) while having desirable electrical characteristics. To further darken or impart a specific color to the liquid, a dye (e.g., an oil dye such as Oil Blue N) or other colorant (e.g., cobalt naphthenate for a violet color, manganese naphthenate for a brown color, or nickel naphthenate for a green color) can be added thereto.

A wide range of pigment particles are also useful, the primary criteria governing their choice being appropriate charge, size and color. The particles can range in size from 100 $\mu$m to less than 1 $\mu$m, but a preferred size range is 5–25 $\mu$m. The particles may exhibit a native charge, or be charged explicitly using a charge-control agent, or may acquire a charge when suspended in the dielectric liquid. Useful particulate materials include titanium dioxide ($TiO_2$), which provides a high-reflectance white appearance; acetylene black or other black electrophotographic toner particles; other inorganic pigments; or organic pigments such as azo and phthalocyanine materials. Typically, a charge-control agent is added to the pigment particles to confer a surface charge (zeta potential). The charge-control agent may be capable of adsorbing directly onto the particle surfaces, or mixed in during fabrication of the particles. Generally, the charge-control agent confers a zeta potential equal to 50–100 elementary charges on the surface of a particle 1 $\mu$m in radius; this produces a sufficient electrophoretic mobility on the order of $10^{-4}$ to $10^{-5}$ $cm^2/V$-sec. Suitable charge-control agents are well known in the art; they may be polymeric or non-polymeric in nature, and may also be ionic or non-ionic. Non-ionic polymeric charge-control agents include polyethylene, polybutene succinimide and various polyvinyl pyridine block copolymers. See, e.g., U.S. Pat. Nos. 5,380,362, 5,066,559 and 4,298,448, the entire disclosures of which are hereby incorporated by reference. The charge-control agent (and any underlying coating) should not interfere with the optical properties of the pigment particles. In a preferred embodiment, a mixture of $TiO_2$ particles and polyethylene is atomized to produce electrophoretic spheres that are largely polyethylene.

The display 120 may be formed, for example, in the manner of fabricating liquid-crystal displays. For example, after their formation, microcapsules 133 containing the electrophoretic composition may be injected into a cell housing two spaced-apart electrodes. Alternatively, microcapsules 130 may be "printed" into a display by any of various methods known in the art, e.g., the techniques used to deposit pressure-rupturable microcapsules onto a substrate to create carbonless copy paper; in this case, the particles are printed onto one of the electrodes 125, 130, after which the other electrode is deposited, printed, or otherwise coated on top of the deposited microcapsules 130.

In an alternative embodiment 145, illustrated in FIG. 1B, microcapsules 133 are immobilized within a transparent matrix or binder 150 that is itself sandwiched between electrodes 125, 130. Once again, application of the appropriately directed electric field results in migration of particles 137 toward transparent electrode 130. So long as microcapsules 133 are dispersed within matrix 150 uniformly and at sufficient density, the resulting visual appearance will be uniform. Matrix 150 is preferably a transparent polymeric material that may be cured (i.e., cross-linked from a low-viscosity state into extremely high viscosity) or otherwise solidified at relatively low temperatures, and which readily accepts, in its low-viscosity state, a dispersion of microcapsules. Useful materials include polyvinyl alcohols, gelatins, epoxies and other resins.

The low-viscosity polymer precursor, into which microcapsules 133 have been suspended at an adequate dispersion density, may be cured in a mold conforming to the two-dimensional or curved shape of electrodes 125, 130, or may instead utilize the electrodes as containment boundaries for an in-situ cure.

Alternatively, microcapsules 133 can be voids or microscopic cavities in matrix 150 formed during its cure. For example, the electrophoretic composition can be dispersed as an emulsion in the uncured (low-viscosity) precursor to matrix 150; curing of the precursor leaves the emulsion droplets suspended and immobilized within the matrix, effectively forming a polymer-dispersed electrophoretic display.

The display can be arranged in any number of configurations, including a unitary, continuous display (i.e., a contiguous extent of microcapsules sandwiched between a single electrode pair); a row or other pattern of discrete groups of microcapsules controlled by a single electrode pair; or multiple-element arrangements containing a plurality of independently addressable display elements, each controlled by a separate electrode pair and comprising, for example, a single continuous display or a pattern of microcapsule groups. Driver 140 can be any suitable power supply, e.g., a DC or pulsed DC circuit, or an AC circuit (where the pulse width or AC period is greater than the switching time of the electrophoretic composition).

Figure 2A:
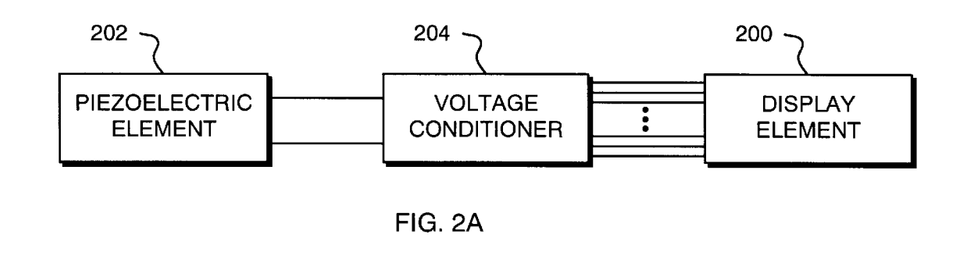
FIGS. 2A and 2B schematically illustrate piezoelectric driver circuitry useful for operating nonemissive displays including (but not limited to) those depicted in FIGS. 1A–1B.
Figure 2B:
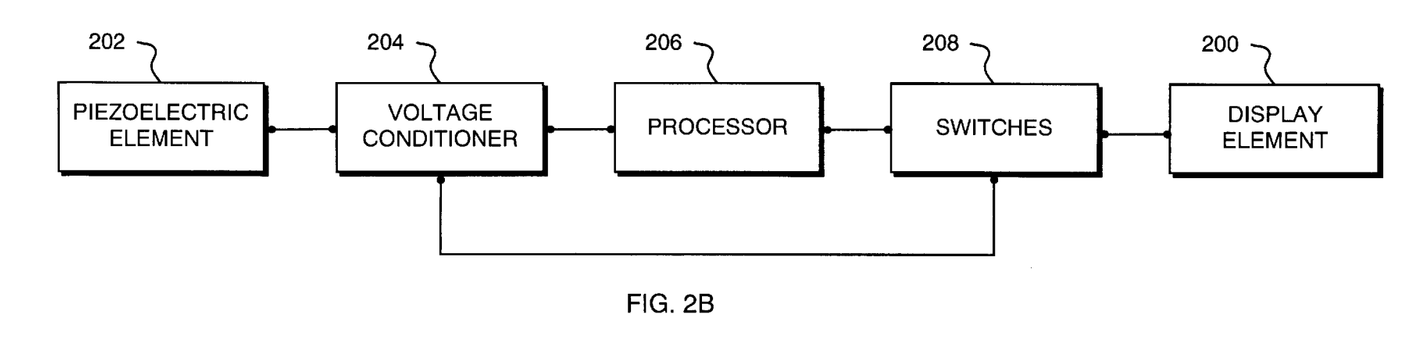

In accordance with another aspect of the invention, however, driver 140 comprises a piezoelectric element. Refer to FIG. 2A, which illustrates the manner in which such an element can be used to drive an electrophoretic display element 200, which comprises one or more individual electrophoretic displays. Physical deformation of the piezoelectric element 202 generates a voltage and current. The electrical output of element 202 may, if appropriate, be supplied directly to display 200; however, it is generally useful to condition the output first. For example, opposite deformations of element 202 produce voltages of opposite polarity; if element 202 is alternately deformed at a rate faster than the switching time of display 200, the display 200 will not respond. A voltage-conditioning circuit 204 may limit or augment the voltage produced by piezoelectric element 202, and may also include a smoothing filter to reduce variation in the voltage output or dampen the response of display 200. In operation, as the piezoelectric element is flexed in different directions, the electric field it produces changes in polarity, causing the charged particles in the electrophoretic display 200 to migrate away from one electrode and toward the other.

It should be stressed that display element 200 is not limited to the electrophoretic displays shown in FIGS. 1A–1B; the approach illustrated in FIG. 2A is applicable to any nonemissive display (e.g., liquid-crystal or electrophoretic displays), regardless of particular features, whose response characteristics are suited to the output of element 202.

A more elaborate arrangement is shown in FIG. 2A. Here, the output of conditioning circuitry 204 is provided as a power supply to a processor 206, and reaches display element via one or more switches 208 controlled by processor 206. Voltage conditioner 204 therefore rectifies and limits the magnitude of the voltage reaching processor 206, which may itself be a programmable, single-chip microprocessor or other suitable circuitry for implementing a control function. Switches 208 may be transistors, the number of which depends on the number of individual electrophoretic display components in element 200. For example, processor 206 can be configured to close one of the switches 208—and thereby provide power to one of the components of display element 200—upon detection of some external condition or at a predetermined time.

Figure 3:
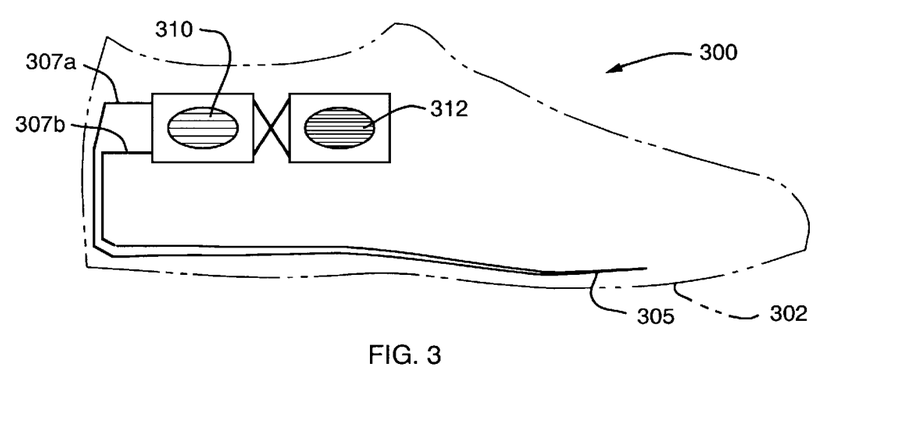
FIG. 3 is a schematic elevation of a specific application of the invention in a footwear environment.

Refer now to FIG. 3, which illustrates a particular application of the invention integrated within an article of footwear apparel 300, such as a shoe. The article 300 includes a bottom portion or sole 302. Disposed within sole 302 is a flexible piezoelectric element 305, e.g., a sheet of polyvinylidene difluoride. The two outputs 307a, 307b are connected to the electrodes of a first electrophoretic display 310, and in the opposite sense to the electrodes of a second electrophoretic display 312. As the wearer of article 300 takes a step, s/he flexes piezoelectric element 305, producing a voltage of a first polarity sufficient to activate one of the displays 310, 312 (i.e., attract the particles to the visible electrode) and deactivate the other display (i.e., draw the particles away from the visible electrode). As the user completes a step, piezoelectric element 305 flattens, producing a voltage of opposite polarity and reversing the respective visual appearances of displays 310, 312. The switching time of the displays is faster than the rate of a normal gait. Again, the configuration shown in FIG. 3 can include voltage-conditioning circuitry if needed.

Figure 4A:
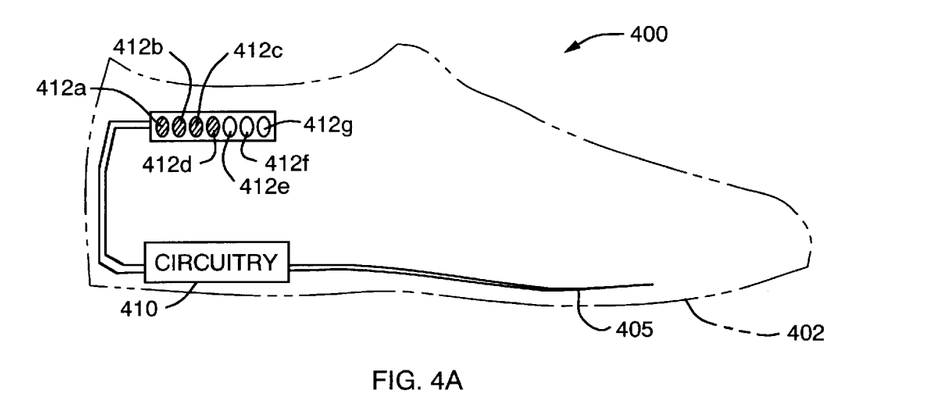
FIG. 4A is a schematic elevation of another footwear application.
Figure 4B:
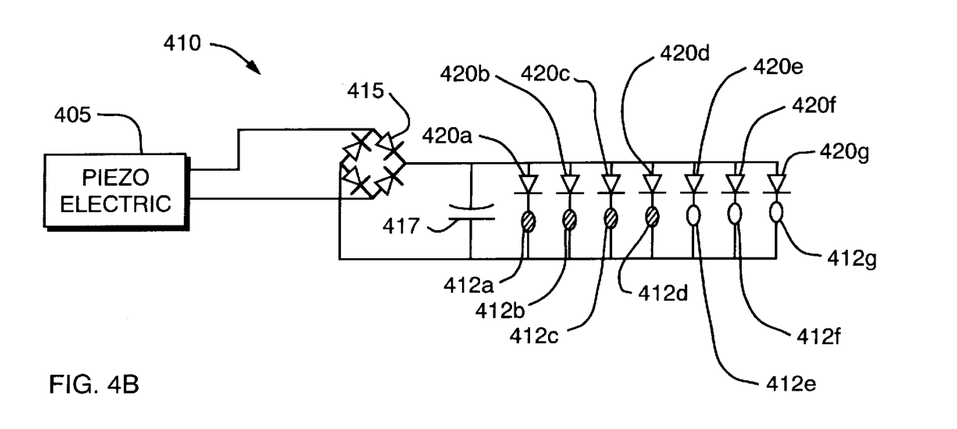
FIG. 4B schematically illustrates representative circuitry for implementing the application shown in FIG. 4A.

FIG. 4A illustrates another application of the invention in the environment of footwear apparel, in this case a pedometer. An article of footwear 400, such as a running shoe, includes a bottom portion or sole 402 associated with a piezoelectric element 405. The outputs of piezoelectric element 405 are connected to a control circuit, described below, that governs the operation of a series of individual electrophoretic displays 412a–g. The number of such displays "turned on" (or "turned off") at any time reflects the number of deformations of piezoelectric element 405 and, hence, the number of steps taken. As shown in FIG. 4B, a suitable circuit 410 includes a full-wave rectifier or bridge 415, the rectified output of which is provided to a capacitor 417 connected in parallel with electrophoretic displays 412a–g. Each display is also connected to a respective diode 420a–g. The diodes 420a–g in the series have increasingly greater breakdown voltages. In operation, all of the electrophoretic displays are initially in the same state. Regular flexing and straightening of piezoelectric element 405 results in an approximately AC voltage output, which is rectified by bridge 415. Each pulse from bridge 415 adds charge onto the plates of capacitor 417, increasing the voltage across the capacitor and, hence, across the diode/display pairs. Each of the displays 412a–g changes state only when the accumulated charge on capacitor 417 exceeds the breakdown voltage of the associated diode. The charge on capacitor 417, of course, reflects the number of steps taken, which therefore determines the number of displays 412a–g that will have changed state. To reset the device, the user activates a switch (not shown) which reverses the connection of capacitor 417 across the diode/display pairs, bypassing the diodes and resetting the displays, and subsequently discharging capacitor 417. The circuit may also include an additional diode or other means for reducing or eliminating the high voltages caused by rapid foot travel, and means for programming the length of the user's stride so that the display reflects distance instead of steps taken.

Figure 5:
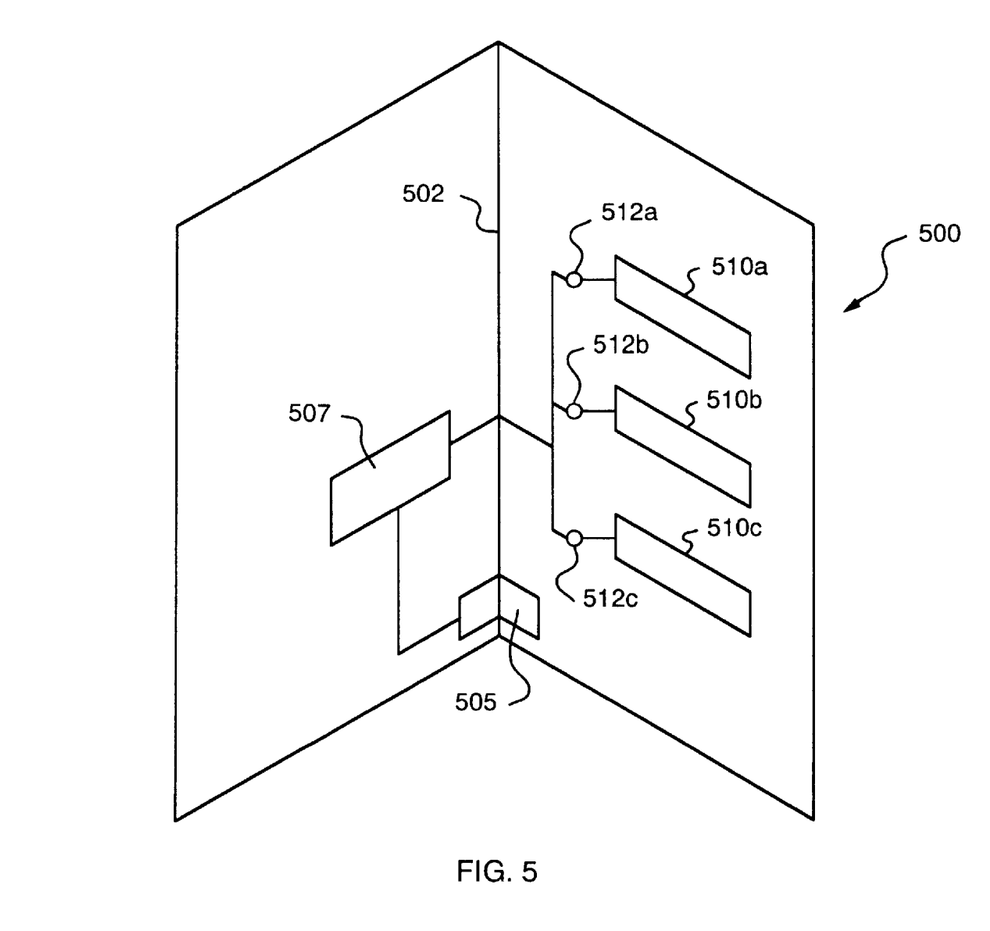
FIG. 5 is a partially schematic isometric view of a specific application of the invention in a paper publication environment.

FIG. 5 illustrates the manner in which the invention can be applied to a paper substrate, such as a book, periodical or greeting card. In the depicted embodiment, a greeting card 500 comprises a central fold 502 and a piezoelectric element 505 disposed thereon. Piezoelectric element 505 is connected (e.g., via a pair of foil traces or other conductors) to a driver circuit 507, which is itself connected to a series of three electrophoretic displays 510a, 510b, 510c via an associated, user-actuable switch 512a, 512b, 512c. Each of displays 510a, 510b, 510c may spell out, for example, a different message. Circuit 507 includes a capacitive storage device that accumulates charge from the current produced by the user's opening of card 500, which deforms piezoelectric element 505. The stored charge is transferred to one of the displays 510a, 510b, 510c through the user's selection of the appropriate switch. A similar arrangement can be used in conjunction with a book or periodical.

The piezoelectric element powering an electrophoretic display need not be activated by direct deformation. Instead, it can be driven by acoustic coupling to another piezoelectric element that is itself subjected to a varying electric field (causing it to deform in proportion to the magnitude of the applied field). Such coupling can conveniently take place on length scales of 5 inches or less for typical piezoelectric displays.

Figure 6:
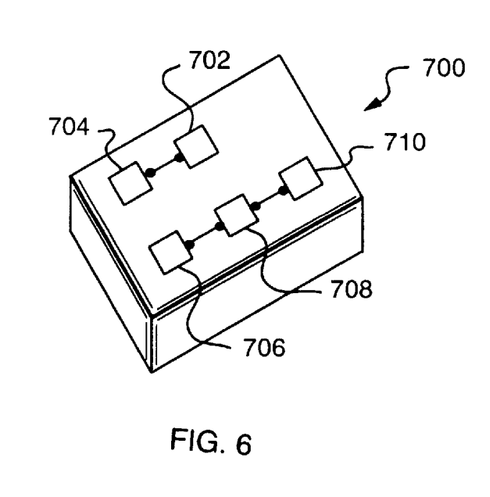
FIG. 6 is a partially schematic isometric view of the invention implemented in an acoustically coupled mode.

Refer to FIG. 6A, which shows how this effect can be exploited in the context of a wristwatch 600. Inside the watch case 602 is a piezoelectric element 604 and an oscillator circuit 606; both of these components may be associated with the timekeeping function of watch 600. The oscillator 606 receives power from an autonomous source (e.g., a battery, not shown) and applies an AC current to piezoelectric element 604. Attached to (or embedded within) the watch band 610 is a second piezoelectric element 612 acoustically coupled to piezoelectric element 604. The outputs of element 612 are provided to a driver circuit 616, which utilizes electrical energy from element 612 to power an electrophoretic display 616. With this simple arrangement, the display 616 would constantly be "turned on."

For this reason, driver circuits 606 and 614 are preferably somewhat more sophisticated, as illustrated in FIG. 6B. Driver 606 is capable of oscillation at two or more frequencies $f_1$, $f_2$. Driver circuit 614 includes a pair of notch or bandpass filters 620, 622 each tuned to a different one of the frequencies $f_1$, $f_2$. That is, each of filters 620 operates within a very narrow frequency band, dropping (or passing) one of the frequencies $f_1$, $f_2$ without affecting other frequencies. The outputs of filters 620, 622 are oppositely connected to display 616; the filters also contain rectifiers so that their outputs to display 616 do not vary in polarity, and any other conditioning circuitry desired for the particular application.

Suppose, for example, that filter 620 drops frequency $f_1$ and filter 622 drops frequency $f_2$. Operation of driver 606 at $f_1$ acoustically couples piezoelectric elements 604 and 612; however, electrical energy from piezoelectric element 612 reach display 616 only through filter 622, placing display 616 in a particular visual state. Operation of driver 606 at $f_2$ reverses the effect produced by filter 622, placing display 616 in the opposite state, since electrical energy passes only through filter 620. The foregoing circuit is useful, for example, in setting and resetting a visual alarm.

The approach of using filters and a single driven "transmitter" piezoelectric element capable of being driven at different frequencies and, therefore, selectably coupled acoustically to multiple "receiver" elements finds application in a wide variety of applications. For example, returning to the embodiment illustrated in FIG. 5, a periodical displayed at a newsstand or an advertising installation might contain several electrophoretic displays, each connected to a piezoelectric element via a differently tuned filter. By altering the frequency at which the transmitter element is driven, it is possible to cycle through the various displays in any desired pattern.

Figure 7A:
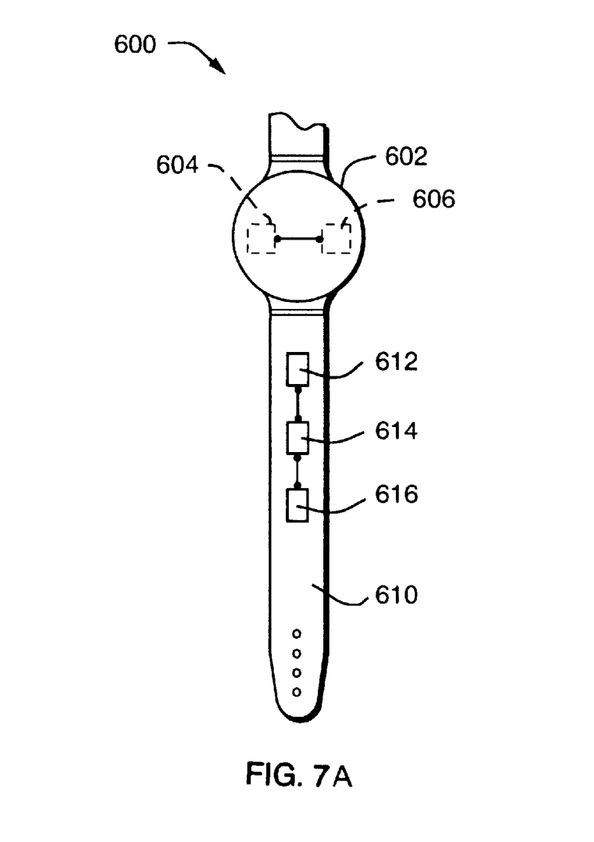
FIG. 7A is a partly schematic plan view of a specific application of the invention in a wristwatch environment.
Figure 7B:
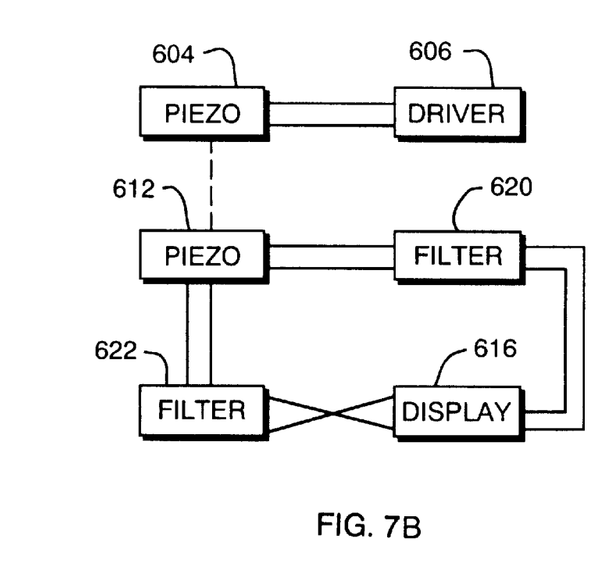
FIG. 7B schematically illustrates representative circuitry for implementing the application shown in FIG. 7A.

The foregoing approach can also be applied, for example, to a pager or other messaging device having a piezoelectric speaker. As shown in FIG. 7, such a device 700 includes an autonomously powered driver circuit 702 that activates a piezoelectric speaker 704 upon receiving a broadcast radio signal from a central station. Such devices are widely used and commonly available. To this device is added a second piezoelectric element 706 acoustically coupled to speaker 704; driver circuitry 708 as discussed previously; and an electrophoretic display 710. When speaker 704 produces its audible alarm, piezoelectric element 706 causes display 710 to change state, thereby providing a visual alarm indication. The display 710 can be used to convey other useful information to the user of a watch, pages, cellular telephone or other portable electronic device (e.g., the status of the battery).

It will therefore be seen that the foregoing represents a reliable and highly flexible approach to the fabrication and powering of electrophoretic and other nonemissive displays. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A nonemissive display system comprising:

a. a paper substrate;

b. at least one electrophoretic display element attached to a surface of the paper substrate for display thereon, the electrophoretic display element comprising discrete microcapsule containers each containing a dielectric fluid and a suspension therein of particles exhibiting surface charges, the fluid and the particles contrasting visually;

c. a power source for creating a potential difference across the at least one display element; and d. means for selectably actuating the power source.

2. The display system of claim 1 wherein the power source is a piezoelectric element.

3. A nonemissive display system comprising:

a. a paper substrate;

b. at least one electrophoretic display element associated with the paper substrate, the electrophoretic display element comprising discrete microcapsule containers each containing a dielectric fluid and a suspension therein of particles exhibiting surface charges, the fluid and the particles contrasting visually;

c. a power source for creating a potential difference across the at least one display element, the power source comprising a piezoelectric element; and d. means for selectable actuating the power source, wherein folding of the paper substrate deforms the piezoelectric element, thereby creating the potential difference.

* * * * *